United States Patent [19]
Carter

[11] 3,811,325
[45] May 21, 1974

[54] APPARATUS FOR COLLECTING SURFACE PARTICLES ON BODY OF WATER

[76] Inventor: Lyle Carter, 1903-33rd Ave., Oakland, Calif. 94601

[22] Filed: Oct. 30, 1972

[21] Appl. No.: 302,215

[52] U.S. Cl. .......................... 73/425.4 R, 114/235 B
[51] Int. Cl. ............................................. G01n 1/10
[58] Field of Search ....... 73/421 B, 425.4 R, 421 R, 73/170 A; 114/235 B

[56] References Cited
UNITED STATES PATENTS

| | | | |
|---|---|---|---|
| 3,404,655 | 10/1968 | Fohl | 114/235 B |
| 3,501,953 | 3/1970 | Cudlitz et al. | 73/170 A |
| 3,466,782 | 9/1965 | Stuart, Jr. | 73/425.4 R |
| 3,482,034 | 12/1969 | Rhoades et al. | 114/235 B X |
| 3,462,995 | 8/1969 | Weiss | 73/421 R |

*Primary Examiner*—Richard C. Queisser
*Assistant Examiner*—Daniel M. Yasich
*Attorney, Agent, or Firm*—Harris Zimmerman

[57] ABSTRACT

An apparatus for sampling and collecting floating particulate matter on the surface of a body of water has parallel spaced apart longitudinal floats supporting a rigid tubular frame. Secured to the frame are two parallel, horizontal hydrofoil bodies spaced apart from each other to form an intake opening. A funnel-shaped net with its wide end secured to the intake opening and its narrow end terminating in a collecting screen collects surface particulate matter which is caused to flow into the intake opening as the apparatus is towed on a body of water. The lower hydrofoil body maintains the intake opening at a predetermined depth below the water surface, while the upper hydrofoil body enables the apparatus to ride over swells.

11 Claims, 4 Drawing Figures

PATENTED MAY 21 1974　　　　　　　　　　　　　3,811,325
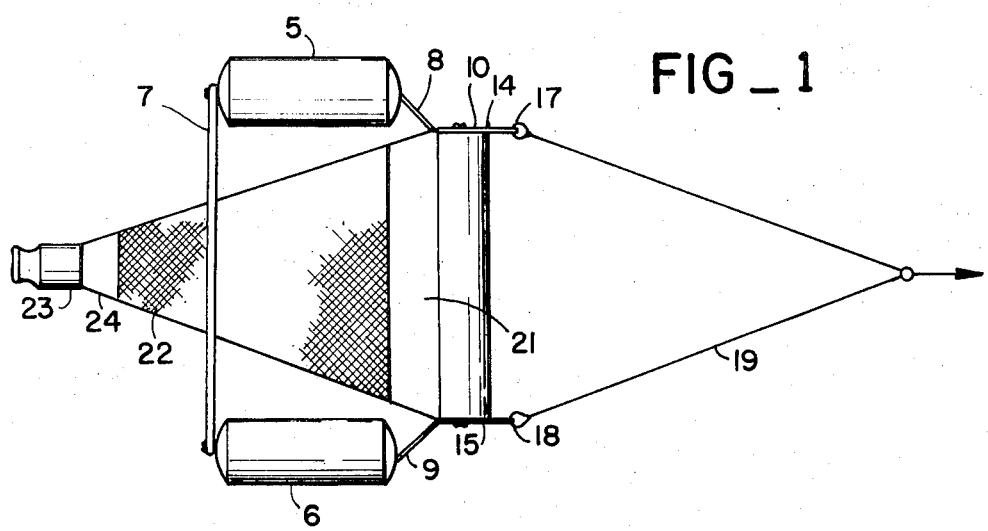
FIG_1
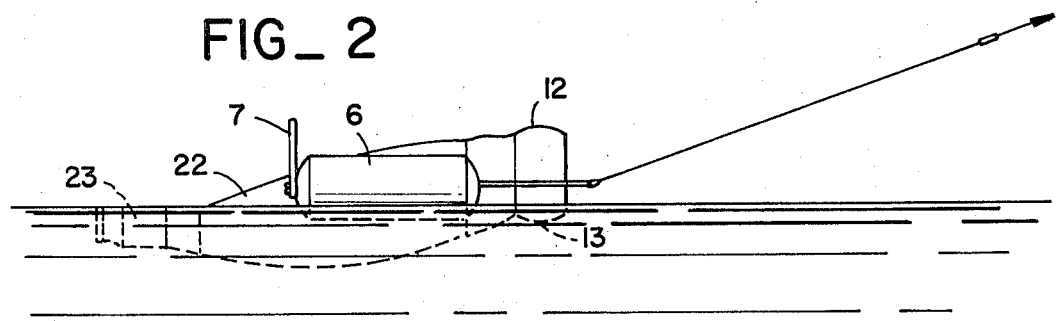
FIG_2
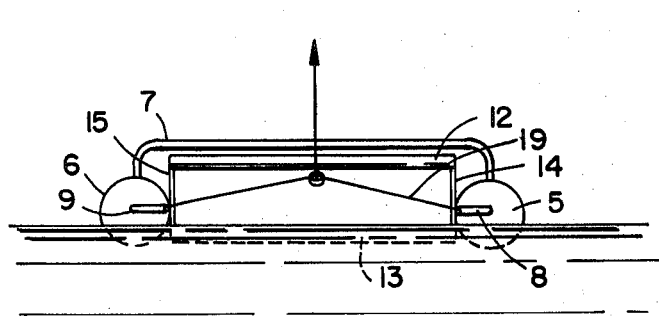
FIG_3
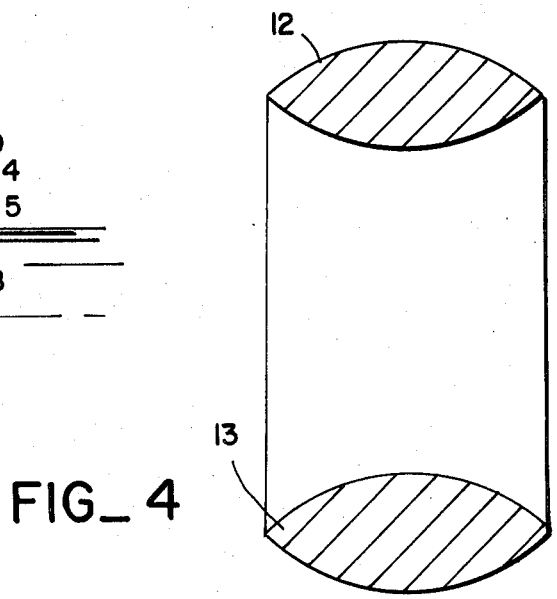
FIG_4

APPARATUS FOR COLLECTING SURFACE PARTICLES ON BODY OF WATER

BACKGROUND OF THE INVENTION

The recent interest in water quality which has been generated by the growing concern for the ecology of the earth has resulted in the surprising discovery that little is known about what constitutes clean water and what compounds found in bodies of water should be labelled pollutants. Furthermore, the methods and techniques employed in sampling water to ascertain its quality vary greatly, the results varying as the method employed.

One approach to ascertaining the extent and significance of surface pollution of large bodies of water is to collect and evaluate the surface floatage on the water. This floatage may include substances varying in size from large floating particulates such as feathers and insects to fine micro-particulates, bacteria, surface plankton, and surface-active molecules. Prior art devices, which are generally oriented toward removing oil slicks or collecting other specific floatage, cannot collect all of the floatage in the described range of size.

Further, much of the surface floatage material has the property of sinking momentarily when encountering any water turbulence. Thus, an effective sampler of surface floatage must skim the surface water without creating any leading turbulence. Prior art devices avoid this problem by scooping the water below the surface as well to ensure catching any sinking floatage. These devices, however, collect submerged as well as surface floatage.

SUMMARY OF THE INVENTION

The present invention is directed toward a water quality sampling device for collecting surface floatage on a body of water. The sampling device which is towed on the surface of the water, is supported by two parallel, longitudinal, spaced apart floats. Secured between the floats is a rigid tubular framework with two horizontal hydrofoil bodies transverse to the floats secured to the framework within the profile of the floats. The vertically stacked hydrofoil bodies define an intake opening, with the lower hydrofoil maintaining the intake opening at a predetermined depth below the water without causing disruptive turbulence, while the upper hydrofoil causes the sampling device to ride over swells and waves. The towing motion causes surface water to flow into the intake opening, where the surface floatage is collected by a funnel-shaped net which has its wide end secured to the intake opening. The net, with the narrow end terminated by a collecting screen, lies partially submerged between the floats.

THE DRAWING

FIG. 1 is a plan view of the present invention;
FIG. 2 is a side view of an embodiment of the present invention;
FIG. 3 is a front end view of the present invention; and
FIG. 4 is a detail side view of the present invention.

DESCRIPTION OF THE PREFERRED EMBODIMENT

As shown in FIG. 1, the present invention includes two substantially cylindrical, parallel floats 5 and 6 fabricated of metal, fiberglass, or the like. The floats are each secured at one end to the arched rear tubular frame member 7, and at the other end to fixed arms 8 and 9, thus rigidly maintaining the floats in a fixed spaced apart relationship. The arms 8 and 9 are secured to the rectangular intake opening 10. The intake opening is formed by hydrofoil bodies 12 and 13 and vertical panels 14 and 15, shown in FIG. 3. Protruding forward of the intake opening are towing eyes 17 and 18, to which a towing bridle 19 is secured. A fabric collar 21 of canvas or similar material attached to the intake opening secures the collecting travel net 22 to the intake. The collecting net, which is typically fabricated of nylon or fiberglass cloth, allows water from the intake to pass through its 500$\mu$ pore mesh, while capturing any particulates larger than that size. The narrow end of the travel net is closed by a screen sampler 23 secured to the net by collar 24. The screen sampler is a fine mesh cloth of inert material such as fiberglass or nylon, which captures fine micro-size particulates and organisms. The travel collecting net and the screen sampler cooperate to trap all large particulate surface floatage within the net, while the collecting screen prevents any micro-particulate from escaping collection.

In use the present invention is towed from the boom of a boat in the undisturbed water adjacent to the boat. The velocity of the towing boat is monitored, and, together with data concerning the length of time of a sampling run and the width of the intake opening, the area covered by a sampling run can be determined. A typical embodiment of the present invention may have an intake opening approximately 1.0 meter wide, and is towed at a velocity of approximately 1.5 knots. After a sampling run is made, the screen sampler 23 is removed and stored for laboratory analysis, a new screen sampler is inserted, and the surface water quality sampling device is ready for another run.

As shown in FIG. 2, the travel net lies partially submerged between the floats, while the screen sampler is completely submerged to ensure that the collected floatage remains in its natural state. The hydrofoil body 13, which rides just below the surface of the water, is shaped to prevent any bow wave turbulence which might cause the surface floatage to sink. Also, the body 13 may be adjusted to control the depth of water sampled, typically from a minimum depth of 2 mm. to a maximum of 2 cm. As shown in FIG. 4, the body 13 skims just below the water surface, directing the surface floatage into the intake opening while avoiding any suspended particulate matter. The upper hydrofoil body 12, shown in FIG. 4, is spaced above body 13 by approximately 20 cm. It is designed to ride up and over any swells or waves, preventing any damage both to the sampling device and to the collected floatage within.

It should be noted that although the lower hydrofoil body is necessary to control sampling of a minimum depth of surface water, the upper hydrofoil body may not be necessary in embodiments of the present invention which are intended for use only in calm water conditions.

Thus it may be seen that the present invention provides a unique means and method for sampling and collecting surface floatage. Moreover, the present invention provides a long-sought means of standardizing the sampling of surface water quality, thereby allowing tests of water quality conducted at different times and locations to be analyzed and compared productively.

I claim:

1. A water quality sampling device for collecting surface floatage from a body of water, comprising:

towing means for moving said sampling device on said body of water in a predetermined direction;

laterally spaced buoyancy means for maintaining said sampling device therebetween on the surface of said body of water; and collecting means secured to said towing means and said buoyancy means for removing and sampling said surface floatage from said surface water, said collecting means including a net having a front opening extending for substantially the width of said device and disposed between said buoyancy means and having a smaller rear opening communicating with a removable fine screen sampling net, said sampler net being disposed rearwardly of said buoyancy means.

2. The water quality sampling device of claim 1, wherein said collecting means further includes intake opening means opening toward said predetermined direction of travel, for receiving oncoming surface water.

3. The water quality sampling device of claim 2, further including hydrofoil means secured to said intake opening means for controlling the depth of surface water received by said intake opening.

4. The water quality sampling device of claim 1, wherein said collecting means further includes a funnel-shaped net with a wide end and a narrow end, said wide end of said net being secured to said intake opening means, said intake opening means directing said oncoming surface water into said wide end of said funnel-shaped net.

5. The water quality sampling device of claim 4, wherein said narrow end of said funnel-shaped net is closed by a fine-mesh screen.

6. The water quality sampling device of claim 1, wherein said buoyancy means further includes elongated float means with the longitudinal axis aligned parallel with said predetermined direction of travel.

7. The water quality sampling device of claim 6, wherein said float means comprises two elongated floats secured to rigid frame means to maintain said floats in a spaced apart relationship transverse to said direction of travel.

8. The water quality sampling device of claim 7, further including intake opening means transverse to said floats and secured therebetween, said intake opening means opening toward said predetermined direction of travel and directing oncoming surface water into said collecting means.

9. The water quality sampling device of claim 8, further including first hydrofoil means secured to said intake opening means for controlling the depth of oncoming surface water received by said intake opening means.

10. The water quality sampling device of claim 9, further including second hydrofoil means secured vertically apart and above said first hydrofoil means to ride up and over any turbulence in said oncoming surface water.

11. A method for sampling the quality of water in a large body of water comprising the steps of:

towing a sampling device including a net having a fine screen attached thereto on the surface of said body of water;

controlling the depth of surface water encountered by said sampling device;

collecting said surface water encountered by said sampling device;

removing the particulate floatage from said collected surface water by both said net and said fine screen;

storing said removed particulate floatage in said sampling device;

returning said collected surface water to said body of water; and retrieving said removed particulate floatage from said net and said fine screen for evaluation.

* * * * *